Nov. 6, 1951  J. J. HOEFER  2,573,971
FRONT END RAKE MEANS FOR TRACTORS
Filed March 21, 1949  3 Sheets-Sheet 1

Nov. 6, 1951        J. J. HOEFER        2,573,971
FRONT END RAKE MEANS FOR TRACTORS

Filed March 21, 1949        3 Sheets-Sheet 2

Witness
Merle A. Bjork

Inventor
J. J. Hoefer
by M. Talbert Dick
Attorney

Nov. 6, 1951   J. J. HOEFER   2,573,971
FRONT END RAKE MEANS FOR TRACTORS
Filed March 21, 1949   3 Sheets-Sheet 3
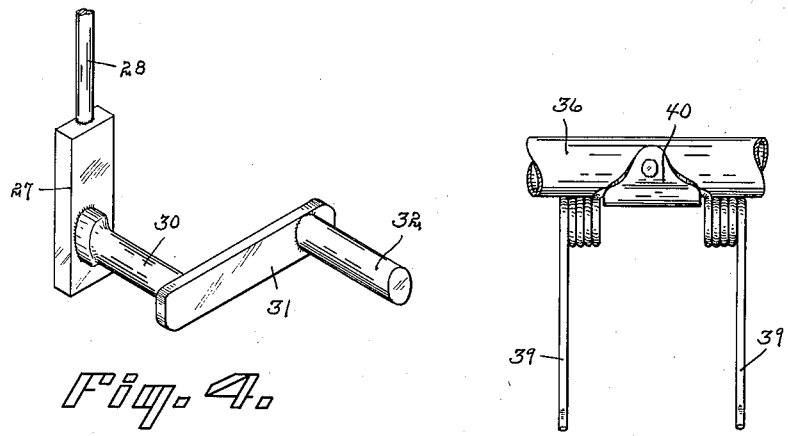
Fig. 4.
Fig. 5.
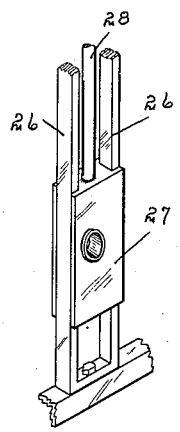
Fig. 6.
Witness
Merle A. Bjork
Inventor
J. J. Hoefer
by M. Talbert Dick
Attorney Patented Nov. 6, 1951

2,573,971

UNITED STATES PATENT OFFICE 2,573,971

FRONT END RAKE MEANS FOR TRACTORS

Jacob J. Hoefer, Williams, Iowa

Application March 21, 1949, Serial No. 82,560

3 Claims. (Cl. 56—27)

The principal object of my invention is to provide a side rake mechanism for the front end of farm tractors that will successfully rake cornstalks, bean stalks, weeds, straw and like vegetable matter toward one side of the tractor.

A further object of my invention is to provide a side rake means for installation on the front end of a tractor that moves the material being raked, to the right side of the tractor, whereby when plowing, the material so raked will fall into the open previously made plow furrow, will then be crushed into the furrow by the rear wheel of the tractor, and lastly covered up by the tractor's trailing plow.

A still further object of this invention is to provide a front end rake for farm tractors that may be easily and quickly attached to or detached from a tractor.

A still further object of this invention is to provide a front end rake for tractors or like that is economical in manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 4 is an enlarged perspective view of the crank support means used in the left side end of the device.

Fig. 5 is an enlarged front view of one of the rake tooth units.

Fig. 6 is an enlarged perspective view of one of the two side end bearing members of the device.

Two major problems now confront farmers. The most recent one is the increasing menace of corn borers throughout the corn raising belt. These pests are on the increase and are damaging crops at the rate in some States of approximately one hundred million dollars annually. Poison sprays are helping as well as the macerating of the dry cornstalks after the corn has been picked. However, if any cornstalks or like remain above the ground after plowing, such stalks or like successfully harbor the larvae, eggs, etc. of the pest. The second problem is the disposal of the straw, cornstalks, bean plants, weeds or like just prior to spring plowing. This is often so heavy that plowing is almost impossible. Not only does the dried vegetation resist the proper turning of the ground by the plow, but the plow becomes completely clogged with the material and either must be manually cleaned or permitted to ride over the collected bunches of material. Obviously, a plow cannot plow under such collected bunches of vegetation. The common procedure is to burn this dry vegetation prior to plowing. This, however, requires much work and time, and destroys the matter as a fertilizer. It is estimated that cornstalks alone are worth five dollars per acre as a fertilizer. The two chief problems therefore of the farmer, is to destroy the corn borer, and be able to utilize the vegetable matter for soil fertilization. I have overcome these two problems by my device which rakes up the dry plant growth ahead of the tractor and prior to the following tractor plows, deposits the same in the previous plow furrows, crushes the same down into the furrow by the rear wheel of the tractor, and then covers the same with earth by action of the following tractor pulled plow. By this method, substantially no cornstalks or like are left in the path of the plow thereby eliminating the prior burning of the same, as well as eliminating "bunching" of the matter over the field and plow-clogging. Also the field when plowed will be even and successfully accomplished. Substantially no dry plant life will be left above the ground in which plant pests can breed. Furthermore, all the dead plant life will be saved for refertilizing the soil. I will now describe my device in detail.

Figure 1:
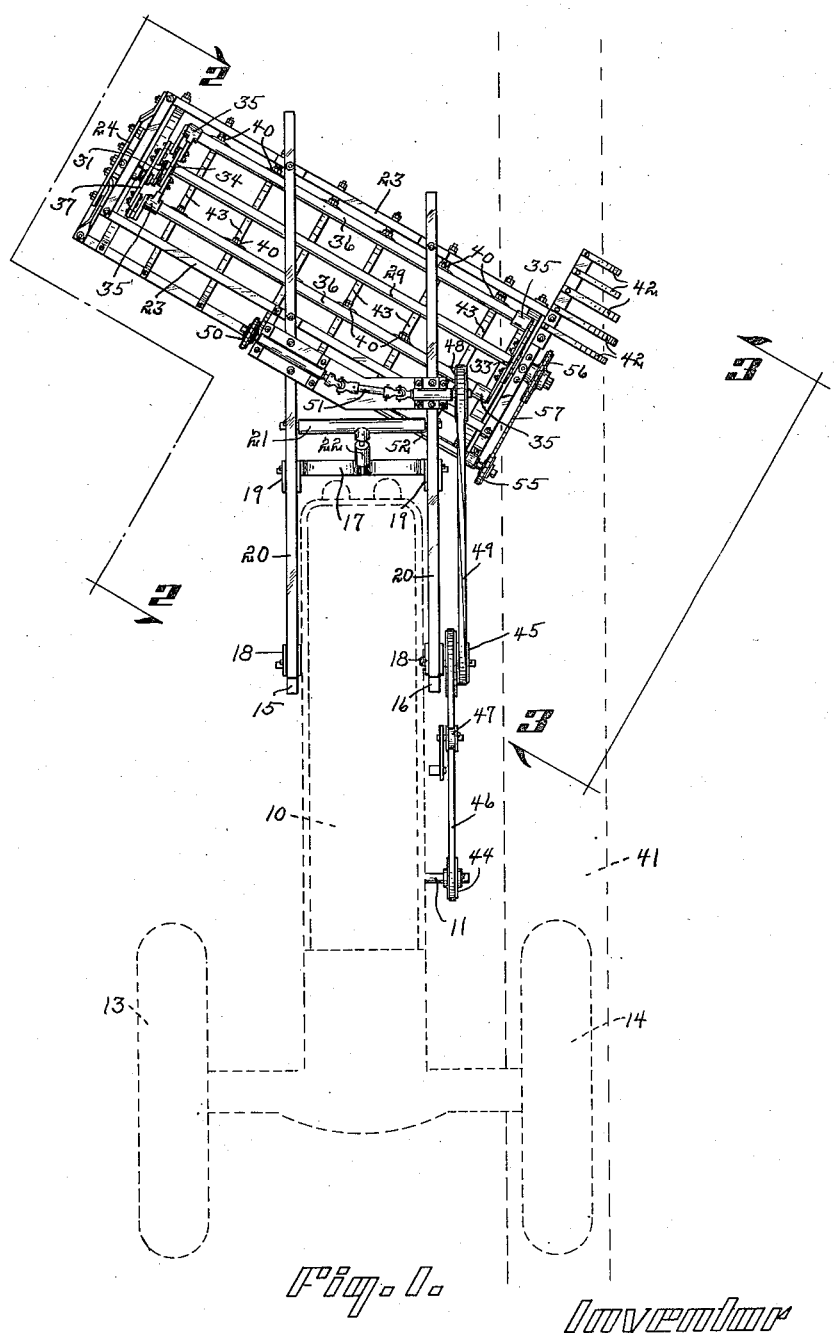
Fig. 1 is a top plan view of my invention mounted on a farm tractor with the major portion of the tractor shown by dotted lines.
Figure 2:
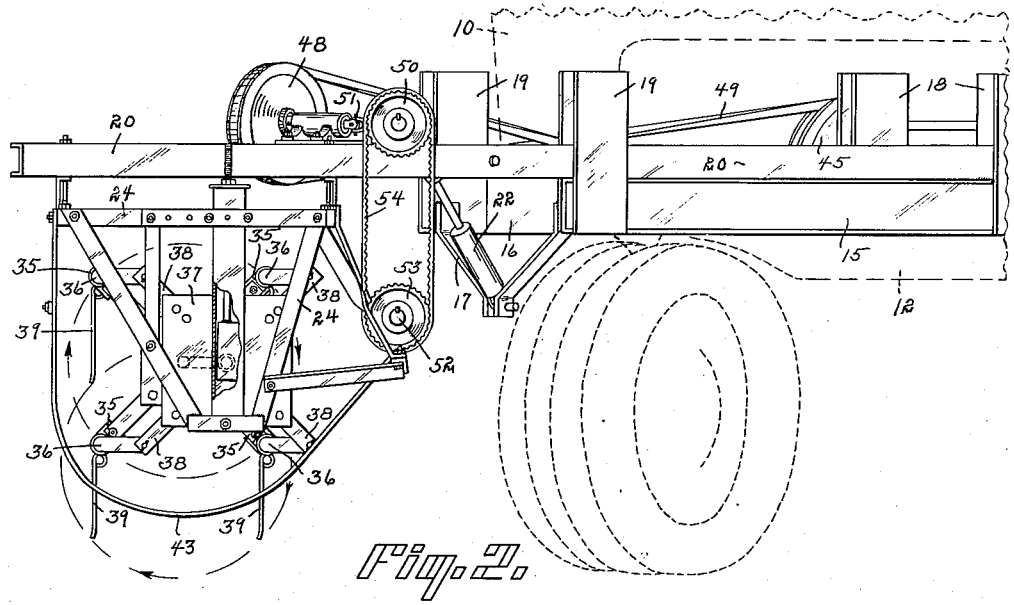
Fig. 2 is a left side view of the device taken from line 2—2 of Fig. 1.
Figure 3:
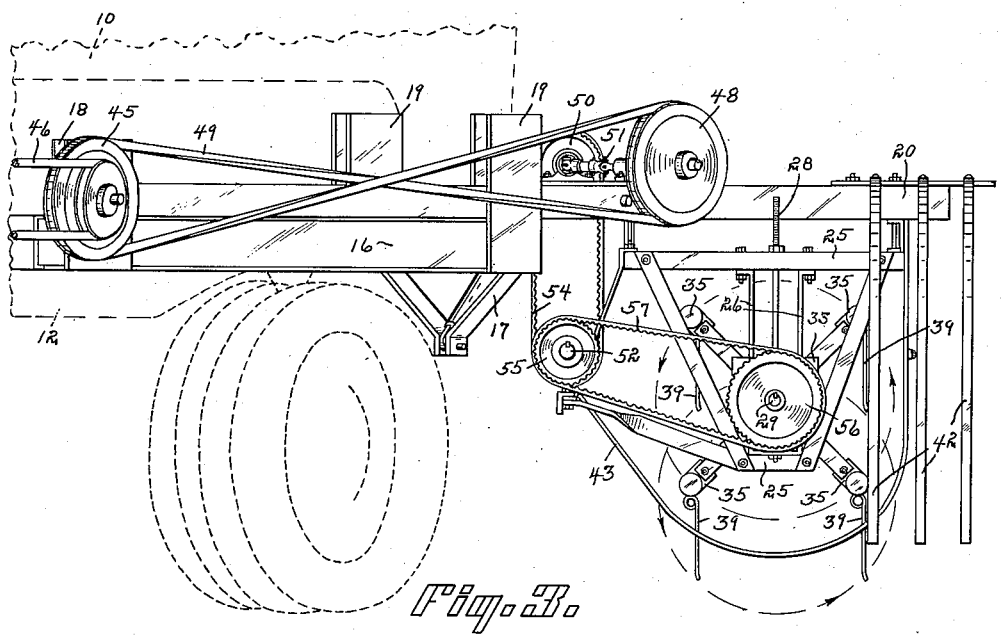
Fig. 3 is a right side view of the device taken from line 3—3 of Fig. 1.

The numeral 10 designates an ordinary farm tractor having the usual power take-off shaft, 11, front frame portion 12, and two back wheels, 13 and 14. Mounted rigidly and horizontally on the front end portion of the tractor are two fixed beams 15 and 16. These two beams are at the two sides of the tractor, respectively, and extend to a point beyond the front end of the tractor as shown in Fig. 1. The numeral 17 designates a cross-brace unit connecting the forward ends of the beams. On each beam is a rearwardly positioned vertically extending open U-bracket 18 and a forwardly positioned vertically extending open U-bracket 19. The numeral 20 designates a supporting beam pivoted at its rear end in each of the two rear bracket U-members. Each of these supporting beams extend forwardly and are capable of vertical sliding action in the U-bracket directly forward of their pivot points respectively. These two supporting beams extend forwardly a substantial distance beyond the forward ends of the beams 15 and 16 and are connected near their center lengths by a cross-brace 21. The numeral 22 designates an ordinary hydraulic lift having one end secured to the brace 17 and its other end secured to the cross-brace 21. This lift is used for moving the end supporting beams 20 upwardly or downwardly relative to the tractor, and as my rake is secured to the supporting beams the same will be lowered or raised accordingly relative to the surface over which the tractor travels. The downward movement of my rake is limited generally by the supporting beams reaching the bottom of the forward U-shaped brackets in which they vertically slide. Mounted on the forward free end portions of the two supporting beams is the rake's horizontal rectangular frame portion 23. This frame is secured at an angle to the longitudinal length of the supporting beams, i. e., it extends from its left side end rearwardly and to the right, as shown in Fig. 1. Depending from the left side end of the frame is a vertical frame means 24. Depending from the right side end of the frame is a vertical frame means 25. On each of the vertical frame means are two parallel bars 26 slidably holding a vertically movable bearing member 27, as shown in Fig. 6. Each of these two slidable bearing members are adjustably moved upwardly or downwardly by a bolt means 28 extending upwardly therefrom and through the rectangular frame portion. As the main rake shafts operate in these two bearing members the rake may be adjusted upwardly or downwardly to conform to the surface terrain or the material being raked. In some instances it may be desirable to only rake the upper portion of the layer of dead plant-life. Furthermore, it may be desirable at times to have one side end of the rake in a lower plane than its other side end. Under such conditions, the shafts, bearings, or bars should have sufficient play or tolerances to prevent any shaft from binding. The numeral 29 designates one of the main rake shafts rotatably extending through the bearing member at the right side end of the rake. This shaft extends forwardly and to the left to a point near the left side end of the rake. The numeral 30 designates a stub shaft rigidly secured to the bearing member on the right side of the rake. The numeral 31 designates a forwardly extending arm fixed on the free inner end of the stub-shaft. The numeral 32 designates a stub shaft fixed on the free forward end of the arm extending to the right. This non-moveable assembly of parts provides two stub shafts, parallel and spaced apart, as shown in Fig. 4. The free right end of the stub shaft extends into the hollow left end of the shaft 29 and thereby rotatably supports the same. The numeral 33 designates a plate secured around the right end portion of the shaft 29. The numeral 34 designates a similar plate fixed around the left end portion of the shaft 29. Extending from each of the two plates are four evenly spaced apart radially extending arm bearing members 35. Rotatably mounted in each pair of horizontal bearing members 35 is a shaft 36. Each of these four shafts 36 has a crank arm formed on its left end, as shown in the drawings. The numeral 37 designates a plate member rotatably mounted on the stub shaft 30. Evenly spaced apart and radially extending from this plate 37 are four arms 38 fixed to the plate and each having their outer end portion rotatably secured to the crank arm of the four shafts 36. By this arrangement when the shaft 29 is rotated the rake cage will rotate carrying the four shafts 36, but due to their crank arms, and linkage with the off-center rotating plate 37 these shafts will remain constant and have no rotation relative to the ground surface. The reason for this is that the rake teeth on the shafts must be maintained in substantially vertical positions throughout their circular raking motion. These spring rake teeth 39 are of standard design and are in pairs secured along the length of each of the shafts 36 by a clamp means 40, as shown in Fig. 5. The rake cage rotates rearwardly when viewed from above and the rake teeth therefore contact the material as they move forwardly over the surface, and due to the angularity of the rake, this material will be moved to the right and in advance of the tractor. In plowing, the back right tractor wheel 14 runs in the plow furrow 41 made in the previous plow round, and as the material attached by the rake is moved into this open furrow, the tractor wheel 14 will run over it and successfully crush it down into the furrow in compact condition. It is highly necessary that the rake throw the material into the open furrow and not beyond it onto the already plowed ground to the right of the open furrow. To prevent this, I have provided a plurality of depending bars 42 on the right front side end of the rake frame to form a grid or shield, as shown in Fig. 1. To prevent material from adhering to the rake teeth, I have provided ordinary spaced apart arcular grate arms 43 that form a slitted shield below the rotating cage parts of the rake. The rake teeth, when in lowered position extend between and below the grate arms 43, as shown in Fig. 3. After the tractor has passed, its trailing plow successfully covers the crushed material in the furrow and provides a new open furrow for the next round. While I have described my device as particularly adapted to the removal of surface material in advance of the plow, it is obvious that it can be used wherever it is desired to rake and move material to one side. In fact, the width of the rake may be greatly increased from that shown in the drawings. Any suitable means may be used to operatively connect the shaft 29 to the engine of the tractor. In the drawings I show a pulley wheel 44 on the shaft 11. The numeral 45 designates a double pulley wheel rotatably mounted on the right U-bracket 18 and in the same plane as the pivot point of the right supporting bar 20. This permits the rake to be lowered or raised without binding or loosening the power linkage. The numeral 46 designates a belt embracing the pulley wheels 44 and 45. The numeral 47 designates an idler wheel for tightening the belt 46. The numeral 48 designates a pulley wheel rotatably mounted on the right support beam 20. The numeral 49 designates a crossed belt embracing the pulley wheels 45 and 48. The numeral 50 designates a sprocket gear rotatably mounted on the left beam 20. The numeral 51 designates a flexible or universal knuckle shaft unit connecting the pulley wheel 48 and the gear 50, as shown in Fig. 1. The numeral 52 designates a shaft rotatably mounted on the rake frame and having a sprocket gear 53. The numeral 54 designates an endless chain embracing the gears 50 and 53. The numeral 55 designates a second sprocket gear on the shaft 52. The numeral 56 designates a sprocket gear on the shaft 29. The numeral 57 designates an endless chain embracing the gears 55 and 56. By this arrangement of parts when the shaft 11 of the tractor is rotating, the rake mechanism also will be functioning.

Some changes may be made in the construction and arrangement of my front end rake means for tractors without departing from the real spirit and purpose of my invention, and it is my intention to cover by my claims, any modified forms of structure or use of mechanical equivalents which may be reasonably included within their scope.

I claim:

1. In combination with a power tractor, an elongated frame, a means for securing said frame to the front end of said tractor with said elongated frame extending to the right and rearwardly relative to the longitudinal axis of said tractor, a horizontal shaft, a bearing member on said frame embracing one end portion of said shaft, a means for operatively connecting said first shaft to the prime mover of said tractor, a fixed stub shaft on said frame having its end rotatably supporting the other end of said first shaft, a plurality of evenly spaced apart radially extending bearing arms operatively supported by one end portion of said first shaft, a like plurality of evenly spaced apart radially extending bearing arms operatively supported by the other end portion of said first shaft, a crank shaft journaled in each horizontal pair of said bearing arms, rake teeth secured to each of said crankshafts, a plate rotatably mounted on said frame, at a point off center from that of said first and said stub shaft, a link arm rotatably secured to each of said crankshafts and rigidly secured to said plate, and a shield on the right side end portion of said frame for limiting the movement of material from the action of said teeth in that direction.

2. In combination with a power tractor, an elongated frame, a means for securing said frame to the front end of said tractor with said elongated frame extending to the right and rearwardly relative to the longitudinal axis of said tractor, a horizontal shaft, a bearing member on said frame embracing one end portion of said shaft, a means for operatively connecting said first shaft to the prime mover of said tractor, a fixed stub shaft on said frame having its end rotatably supporting the other end of said first shaft, a plurality of evenly spaced apart radially extending bearing arms operatively supported by one end portion of said first shaft, a like plurality of evenly spaced apart radially extending bearing arms operatively supported by the other end portion of said first shaft, a crank shaft journaled in each horizontal pair of said bearing arms, rake teeth secured to each of said crankshafts, a plate rotatably mounted on said frame, at a point off center from that of said first and said stub shaft, a link arm rotatably secured to each of said crank shafts and rigidly secured to said plate, a shield on the right side end portion of said frame for limiting the movement of material from the action of said teeth in that direction, and a means for raising and lowering said frame relative to said tractor.

3. In combination with a power tractor, an elongated frame, a means for securing said frame to the front end of said tractor with said elongated frame extending to the right and rearwardly relative to the longitudinal axis of said tractor, a horizontal shaft, a bearing member on said frame embracing one end portion of said shaft, a means for operatively connecting said first shaft to the prime mover of said tractor, a fixed stub shaft on said frame having its end rotatably supporting the other end of said first shaft, a plurality of evenly spaced apart radially extending bearing arms operatively supported by one end portion of said first shaft, a like plurality of evenly spaced apart radially extending bearing arms operatively supported by the other end portion of said first shaft, a crankshaft journaled in each horizontal pair of said bearing arms, rake teeth secured to each of said crankshafts, a plate rotatably mounted on said frame, at a point off center from that of said first and said stub shaft, a link arm rotatably secured to each of said crankshafts and rigidly secured to said plate, a shield on the right side end portion of said frame for limiting the movement of material from the action of said teeth in that direction, a means for raising and lowering said frame relative to said tractor, and a plurality of guard rods extending below said crank shafts.

JACOB J. HOEFER.

REFERENCES CITED

The following references are of record in the file of this patent:

UNITED STATES PATENTS

| Number | Name | Date |
| --- | --- | --- |
| 754,990 | Geery | Mar. 22, 1904 |
| 946,883 | Smith | Jan. 18, 1910 |
| 1,435,293 | Grieves | Nov. 14, 1922 |
| 2,265,405 | Strantz | Dec. 9, 1941 |
| 2,296,065 | Slamp | Sept. 15, 1942 |
| 2,352,479 | Huddle | June 27, 1944 |
| 2,436,475 | Jones et al. | Feb. 24, 1948 |